United States Patent
Kachmar

(10) Patent No.: US 10,481,347 B2
(45) Date of Patent: Nov. 19, 2019

(54) FIBER OPTIC CABLE ASSEMBLY WITH INTEGRAL STRAIN RELIEF

(75) Inventor: Wayne M. Kachmar, North Bennington, VT (US)

(73) Assignee: CommScope Technologies LLC, Hickory, NC (US)

( * ) Notice: Subject to any disclaimer, the term of this patent is extended or adjusted under 35 U.S.C. 154(b) by 912 days.

(21) Appl. No.: 13/396,312

(22) Filed: Feb. 14, 2012

(65) Prior Publication Data

US 2013/0004133 A1 Jan. 3, 2013

Related U.S. Application Data

(60) Provisional application No. 61/442,627, filed on Feb. 14, 2011.

(51) Int. Cl.
*G02B 6/38* (2006.01)
*G02B 6/02* (2006.01)

(52) U.S. Cl.
CPC ....... *G02B 6/3887* (2013.01); *G02B 6/02395* (2013.01)

(58) Field of Classification Search
CPC .......................... G02B 6/3887; G02B 6/02395
See application file for complete search history.

(56) References Cited

U.S. PATENT DOCUMENTS

| | | | |
|---|---|---|---|
| 4,514,037 A * | 4/1985 | Bishop et al. | 385/128 |
| 4,880,290 A * | 11/1989 | Kumazawa | G02B 6/245 385/95 |
| 5,058,983 A | 10/1991 | Corke et al. | |
| 5,898,811 A * | 4/1999 | DiGiovanni | G02B 6/4482 385/102 |
| 5,943,460 A | 8/1999 | Mead et al. | |
| 6,758,601 B2 | 7/2004 | Holmquist | |
| 8,090,232 B2 | 1/2012 | Kachmar | |
| 8,391,658 B2 | 3/2013 | Kachmar | |
| 8,467,560 B2 * | 6/2013 | Weber | D07B 1/16 381/184 |
| 2003/0016926 A1 * | 1/2003 | Hofstadler | H01J 49/0059 385/125 |
| 2003/0068147 A1 * | 4/2003 | Nechitailo | G02B 6/4429 385/114 |
| 2005/0008317 A1 * | 1/2005 | Kuramoto | G02B 6/1221 385/129 |
| 2005/0111811 A1 * | 5/2005 | Cooke | G02B 6/4455 385/136 |

(Continued)

FOREIGN PATENT DOCUMENTS

JP 3813219 B2 8/2006

OTHER PUBLICATIONS

International Search Report and Written Opinion dated Jul. 11, 2012.

*Primary Examiner* — Chris H Chu
(74) *Attorney, Agent, or Firm* — Merchant & Gould P.C.

(57) ABSTRACT

A fiber optic cable assembly includes a fiber optic cable having an end portion. The fiber optic cable includes an optical fiber and an outer jacket surrounding the optical fiber. The outer jacket is formed of a base material that hardens in response to exposure to an energy source. The end portion of the fiber optic cable has a hardness that is greater than a hardness of a remaining portion of the fiber optic cable. A connector assembly is engaged to the end portion of the fiber optic cable.

13 Claims, 4 Drawing Sheets

(56) References Cited

U.S. PATENT DOCUMENTS

| | | | |
|---|---|---|---|
| 2006/0171653 A1* | 8/2006 | Demos | H01L 21/02126 385/147 |
| 2007/0260223 A1* | 11/2007 | Scheibe | A61M 25/0136 604/528 |
| 2008/0019650 A1* | 1/2008 | Hokansson | G02B 6/0288 385/128 |
| 2008/0317415 A1* | 12/2008 | Hendrickson | G02B 6/3849 385/77 |
| 2009/0163818 A1* | 6/2009 | Zelenka | A61B 8/12 600/467 |
| 2009/0297102 A1* | 12/2009 | Kachmar | 385/87 |

* cited by examiner

FIBER OPTIC CABLE ASSEMBLY WITH INTEGRAL STRAIN RELIEF

CROSS-REFERENCE TO RELATED APPLICATION

The present application claims the benefit of U.S. Provisional Patent Application Ser. No. 61/442,627, filed Feb. 14, 2011, which application is hereby incorporated by reference in its entirety.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) a jacket. Optical fibers function to carry optical signals. A typical optical fiber includes a core surrounded by a cladding that is covered by a protective coating or coatings. Buffer layers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Jackets provide protection against damage caused by crushing, abrasions, and other physical damage. Jackets also provide protection against chemical damage (e.g., ozone, alkali, acids).

SUMMARY

An aspect of the present disclosure relates to a fiber optic cable assembly. The fiber optic cable assembly includes a fiber optic cable having an end portion. The fiber optic cable includes an optical fiber and an outer jacket surrounding the optical fiber. The outer jacket is formed of a base material that hardens in response to exposure to an energy source. The end portion of the fiber optic cable has a hardness that is greater than a hardness of a remaining portion of the fiber optic cable. A connector assembly is engaged to the end portion of the fiber optic cable.

Another aspect of the present disclosure relates to a method of assembling a fiber optic cable assembly. The method includes securing a connector assembly to an end portion of a fiber optic cable. A portion of the end portion of the fiber optic cable is exposed to an energy source to harden the portion of the end portion of the fiber optic cable.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
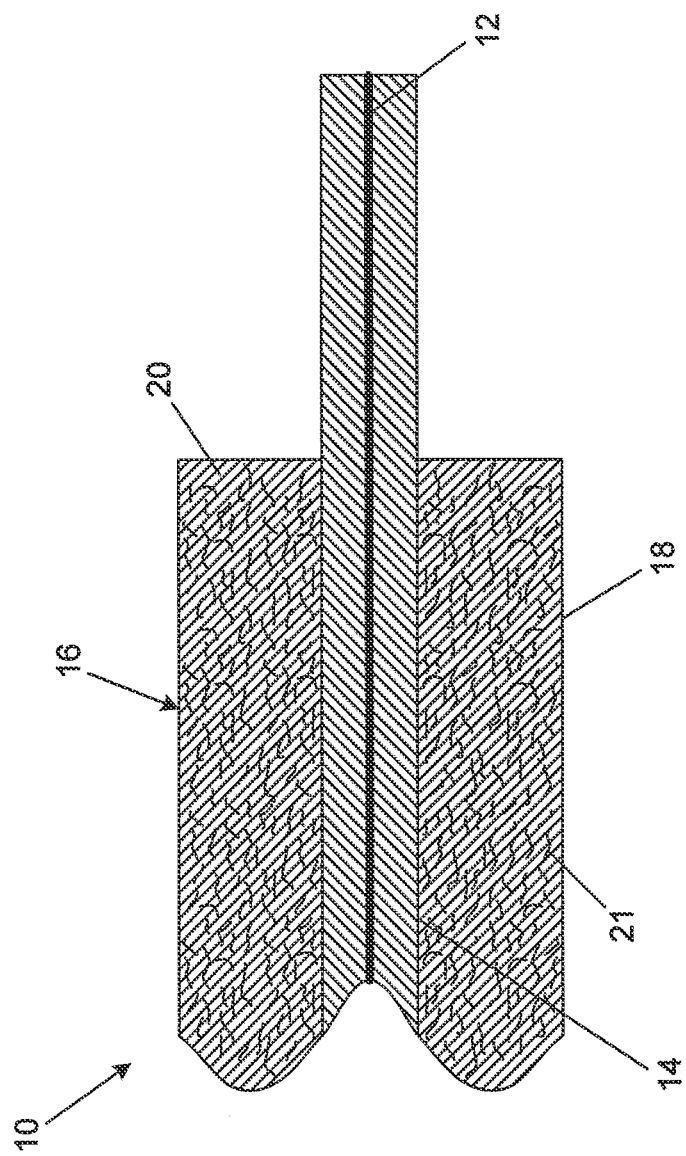
FIG. 1 is a cross-sectional view of a fiber optic cable having exemplary features of aspects in accordance with the principles of the present disclosure.
Figure 2:
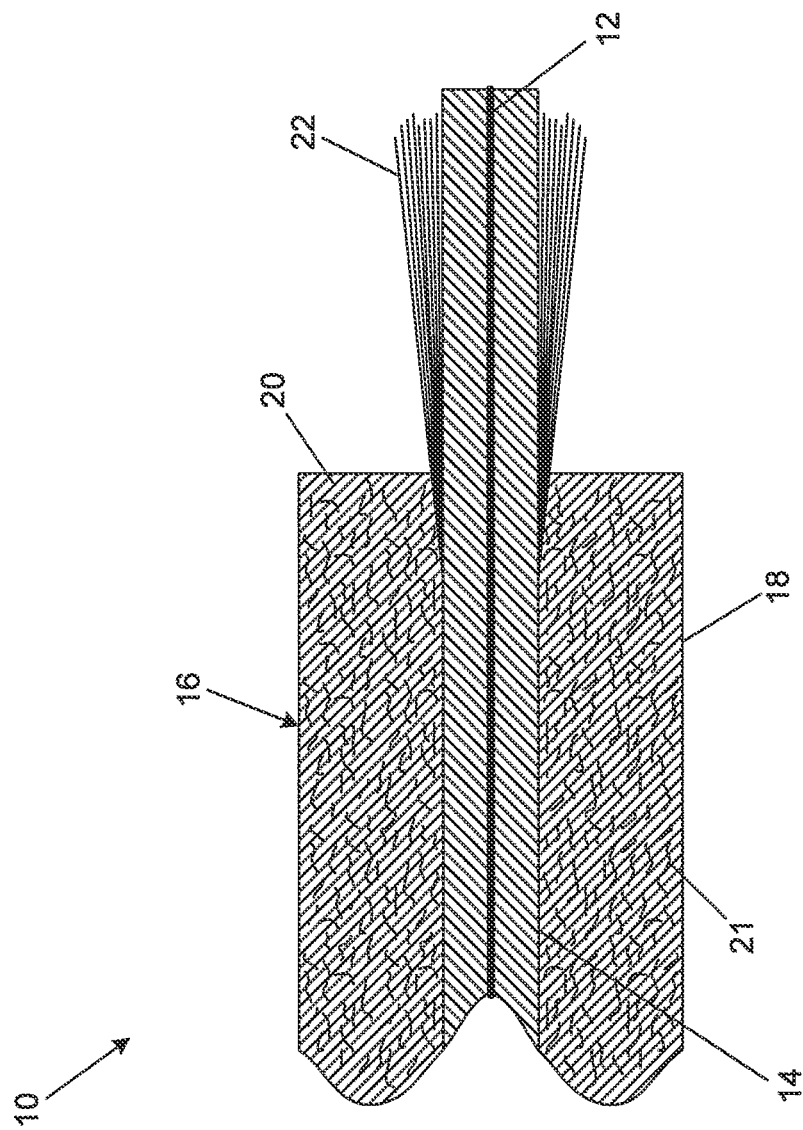
FIG. 2 is a cross-sectional view of an alternate embodiment of a fiber optic cable.

Referring now to FIGS. 1 and 2, a fiber optic cable 10 is shown. The fiber optic cable 10 includes at least one optical fiber 12, a buffer layer 14 and an outer jacket 16.

The optical fiber 12 carries optical signals through the fiber optic cable 10. Typically, the optical fiber 12 includes a core, which is the light-conducting central portion of the optical fiber 12, and a cladding. The cladding surrounds the core and is typically composed of a silica-based material having a lower index of refraction than the silica-based material of the core. Light is internally reflected within the core to transmit the optical signal along the core. In addition to the core and cladding, the optical fiber usually includes one or more protective acrylate polymer coatings that surround the cladding. Typical outside diameters for the cores of the optical fibers 12 are less than or equal to about 10 μm for a single mode or bend insensitive core (or less than or equal to about 62 μm for multimode core), less than or equal to about 150 μm for the cladding, and less than or equal to about 300 μm for one or more protective coatings.

In the subject embodiment, the buffer layer 14 is depicted as a tight buffer layer that surrounds the optical fiber 12. The buffer layer 14 provides protection of the optical fiber 12. It will be appreciated that the buffer layer 14 can be made of a polymeric material such as polyvinyl choloride (PVC). Other polymeric materials (e.g., polyethylenes, polyurethanes, polypropylenes, polyvinylidene fluorides, ethylene vinyl acetate, nylon, polyester, or other materials) may also be used. Typically, the outer diameter of the buffer layer 14 is less than or equal to about 950 μm. In certain embodiments, however, the fiber optic cable 10 may not include the buffer layer 14.

The outer jacket 16 surrounds the optical fiber 12. In the depicted embodiment, the outer jacket 16 surrounds the buffer tube 14 and the optical fiber 12. The outer jacket 16 includes an outer surface 18.

The outer jacket 16 includes a base material 20 (e.g., polyethylene, polypropylene, ethylene-propylene, copolymers, polystyrene, and styrene copolymers, PVC, polyamide (nylon), flouropolymers, polyesters such as polyethylene terephthalate, polyetheretherketone, polyphenylene sulfide, polyetherimide, polybutylene terephthalate, low smoke zero halogens, polyolefins and polycarbonate, as well as other thermoplastic materials). The base material 20 of the outer jacket 16 is energy-active. An energy-active material is one in which the material properties of the material (e.g., hardness, rigidity, stiffness, etc.) change as a result of exposure to an energy source. In one embodiment, the material property is hardness. In one embodiment, the energy source is ultraviolet light. In another embodiment, the energy source is an electron beam. In another embodiment, the energy source is plasma discharge.

In one embodiment, the outer jacket 16 includes a plurality of reinforcement members 21 (e.g., rods, tendrils, extensions, fibers, etc.), such as aramid yarns or amorphous liquid crystal polymers, embedded in the base material 20 of the outer jacket 16. The plurality of reinforcement members 21 are embedded in the outer jacket 16 to increase the tensile strength of the outer jacket 16 and to decrease the percent elongation of the outer jacket 16 when the outer jacket 16 is subjected to a tensile force. In one embodiment, the reinforcement members 21 make up about 40% to about 70% of the total weight of the outer jacket 16. In another embodiment, the reinforcement members 21 make up at least about 40% of the total weight of the outer jacket 16.

Each of the reinforcement members 21 has a length that is less than the total length of the fiber optic cable 10. In certain embodiments, the lengths of the reinforcement members 21 are less than or equal to 3.2 mm, while the diameter of the reinforcement members 21 is less than or equal to 100 μm.

In another embodiment, the volume of reinforcement members 21 in the base material 20 and dimensions of the reinforcement members 21 are such that the elongation of the outer jacket 16 is less than 3% when the jacket is subjected to a 26 lb. tensile force. In another embodiment, the volume of reinforcement members 21 in the base material 18 and dimensions of the reinforcement members 21 are such that the elongation of the outer jacket 16 is less than 2% when the outer jacket 16 is subjected to a 26 lb. tensile force. In another embodiment, the volume of reinforcement members 21 in the base material 20 and dimensions of the reinforcement members 21 are such that the elongation of the outer jacket 16 is less than 1% when the jacket is subjected to a 26 lb. tensile force. The reinforcement members 21 are evenly distributed in the base material 20 of the outer jacket 16. While the orientation of the reinforcement members 21 prior to extrusion is generally random, during the extrusion process, the reinforcement members 21 have lengths generally aligned with the longitudinal axis of the fiber optic cable 10.

In the depicted embodiment of FIG. 2, the fiber optic cable 10 includes a plurality of strength members 22. In one embodiment, the strength members 22 are aramid yarns. The strength members 22 extend the length of the fiber optic cable 10. In the depicted embodiment, the strength members 22 are disposed between the outer jacket 16 and the optical fiber 12.

Figure 3:
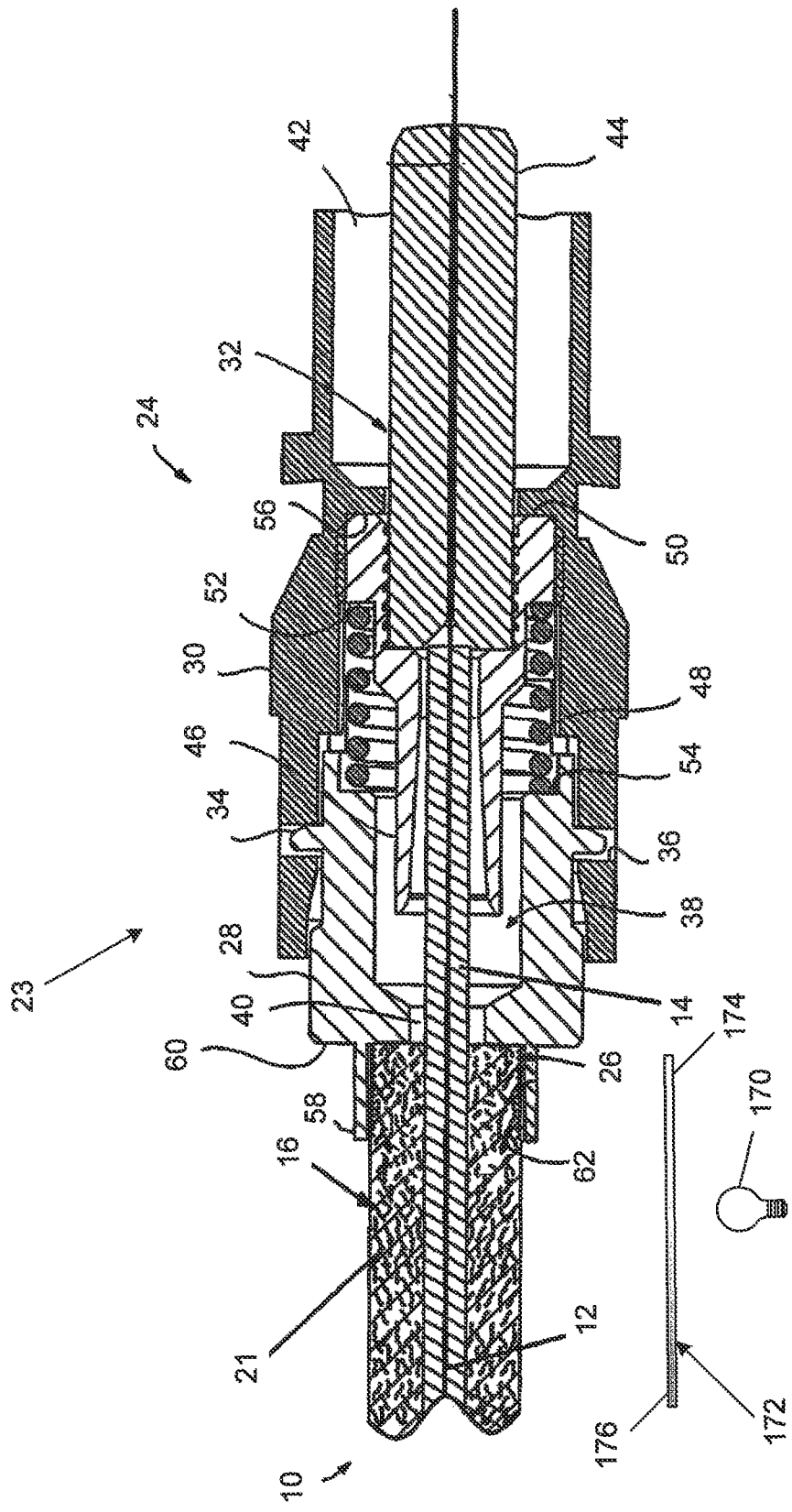
FIG. 3 is a cross-sectional view of a fiber optic cable assembly.

Referring now to FIG. 3, a fiber optic cable assembly 23 is shown. The fiber optic cable assembly 23 includes the fiber optic cable 10 and a fiber optic connector 24.

The fiber optic cable 10 includes an end portion 26. The end portion 26 is adapted to engage the fiber optic connector 24.

In the depicted embodiment, the fiber optic connector 24 includes a rear housing 28, a front housing 30, and a ferrule assembly 32. The rear housing 28 is held in snap-fit engagement with the front housing 30 by a plurality of tabs 34 defined by the rear housing 28 and corresponding recesses 36 defined by the front housing 30. The rear housing 28 and the front housing 30 cooperate to define a central passageway 38, which includes a proximal portion 40 and a distal portion 42.

The ferrule assembly 32 of the fiber optic connector 24 is disposed in the central passageway 38 of the fiber optic connector 24. The ferrule assembly 32 includes a ferrule 44 (e.g., a ceramic ferrule), a ferrule holder 46 that is mounted on the ferrule 44, and a spring 48. The ferrule holder 46 includes an end surface 50 and a shoulder 52. In the fiber optic connector 24, the spring 48 is disposed between the shoulder 52 of the ferrule holder 46 and a spring surface 54 defined by the rear housing 28. With the spring 48 disposed between the ferrule holder 46 and the rear housing 28, the spring 48 biases the ferrule 44 toward the distal portion 42 of the central passageway 38. The ferrule holder 46 is retained in the fiber optic connector 24 by the abutment of the end surface 50 and a rim 56 defined by the front housing 40.

In the depicted embodiment, the rear housing 28 of the fiber optic connector 24 includes a connector end 58 that protrudes from an end surface 60 of the rear housing 28. The connector end 58 defines an inner cavity 62 that is adapted to receive the outer jacket 16 of the end portion 26 of the fiber optic cable 10. In the depicted embodiment of FIG. 3, the connector end 58 is made up of a thin wall of material (e.g., copper, etc.) that is generally cylindrical in shape. The thin wall of the connector end 58 allows for the connector end 58 to be easily deformed (e.g., crimped) around the outer surface 18 of the outer jacket 16.

In one embodiment, adhesive is disposed between the inner cavity 62 of the fiber optic connector 24 and the outer jacket 16 of the end portion 26 of the fiber optic cable 10. The adhesive is adapted to aid in securing the fiber optic connector 24 to the end portion 26 of the fiber optic cable 10. In one embodiment, the adhesive is an energy-cured adhesive. A energy-cured adhesive is one that transforms from a low viscosity liquid to a crosslinked solid in response to the application of energy from an energy source (e.g., ultraviolet light, electron beam, plasma discharge, etc.).

Figure 4:
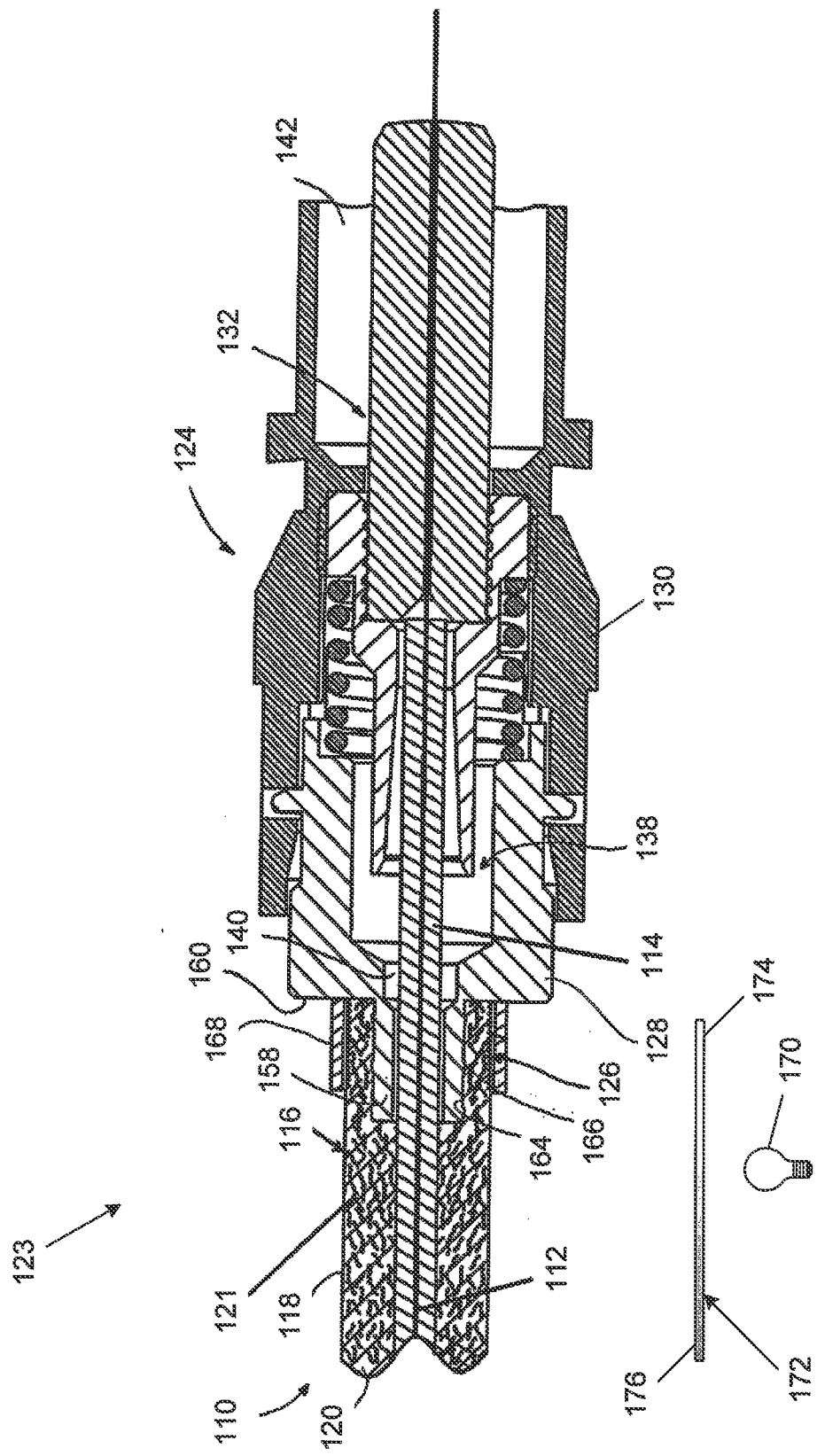
FIG. 4 is a cross-sectional view of an alternate fiber optic cable assembly.

Referring now to FIG. 4, an alternate embodiment of a fiber optic cable 110 and a fiber optic connector 124 are shown. The fiber optic cable 110 includes an optical fiber 112, a buffer layer 114, and an outer jacket 116 having an outer surface 118. The outer jacket 116 is formed of a base material 120. The base material 120 is energy-active. In the depicted embodiment, the outer jacket 116 includes a plurality of reinforcement members 121 embedded in the base material 120.

The outer jacket 116 further includes an end portion 126. The outer jacket 116 further defines a bore 164 that is disposed in the end portion 126. The bore 164 is adapted to receive a connector end 158 of the fiber optic connector 124.

The fiber optic connector 124 includes a rear housing 128, a front housing 130, and a ferrule assembly 132. The fiber optic connector 124 defines a central passageway 138 having a proximal portion 140 and a distal portion 142. The connector end 158 extends from an end surface 160 of the rear housing 128 of the fiber optic connector 124. The connector end 158 includes a plurality of flared portions 166 that open toward the distal portion 142 of the central passageway 138. This orientation of the flared portions 166 prevents inadvertent disengagement of the connector end 158 from the bore 164 in the end portion 126 of the outer jacket 116. The flared portions 166 of the connector end 158 of the fiber optic connector 124 and a crimp 168, which is positioned exterior to the outer surface 118 of the fiber optic cable 110, aid in retaining the fiber optic connector 124 to the end portion 126 of the fiber optic cable 110.

In one embodiment, an adhesive is disposed between the flared portions of the connector end 158 of the fiber optic connector 124 and the bore 164 of the fiber optic cable 10. The adhesive is energy-cured.

Referring now to FIGS. 3 and 4, a method for assembling the fiber optic connector assembly 23 will be described. In one embodiment, the optical fiber 12 is inserted into a center passage of the ferrule 44. In another embodiment, the optical fiber 12 is fused to an optical fiber stub of the ferrule assembly 32.

In the depicted embodiment of FIG. 3, the end portion 26 of the fiber optic cable 10 is inserted into the inner cavity 62 of the connector end 58 of the fiber optic connector 24 when the optical fiber 12 engaged to the ferrule assembly 32. With the end portion 26 of the fiber optic cable 10 inserted into the inner cavity 62 of the connector end 58, the fiber optic connector 24 is secured to the fiber optic cable 10. In the depicted embodiment, the end portion 26 is crimped around the end portion 26. In one embodiment, a length of the strength members 22 are disposed between the outer surface 18 of the outer jacket 16 and the crimp. In another embodiment, the strength members 22 are affixed to the fiber optic connector 24.

With the fiber optic connector 24 secured to the fiber optic cable 10, an energy source 170 (e.g., UV light, electron beam, plasma discharge, etc.) is applied to the end portion 26 of the fiber optic cable 10 to harden a portion of the end portion 26 of the fiber optic cable 10. As the base material 20 of the outer jacket 16 of the fiber optic cable 10 is an energy-active material, the energy source 170 will harden the portion of the fiber optic cable 10 that is exposed to the energy source 170. In one embodiment, the remaining portion of the outer jacket 16 of the fiber optic cable 10 is shielded from the energy source 170 so that the portion of the outer jacket 16 that is exposed to the energy source 170 has a hardness that is greater than the hardness of the remaining portion of the outer jacket 16. The increased hardness of the outer jacket 16 is adapted to serve as a strain relief that is integral with the fiber optic cable 10. With the strain relief being integral with the outer jacket 16, a separate strain relief boot is not needed. In another embodiment, the remaining portion of the outer jacket 16 that is within an energy exposure area is masked using an energy opaque material (e.g., tape, sheeting, etc.).

In the depicted embodiment of FIG. 3, the energy source 170 is applied through a filter 172. The filter 172 includes a first end 174 and an oppositely disposed second end 176. The filter 172 is arranged so that the first end 174 is disposed closer to the fiber optic connector 24 than the second end 176. In one embodiment, the filter 172 is a graduated filter. The graduated filter allows more energy (e.g., UV light, electron beam, etc.) through the first end 174 of the filter 172 than through the second end 176. The amount of energy from the energy source 170 that is allowed through the filter 172 decreases from the first end 174 to the second end 176. In one embodiment, the filter 172 does not allow any energy from the energy source 170 through the second end 176.

By having a filter 172 that is graduated, the amount of exposure to energy from the energy source 170 along a length of the portion of the end portion 26 of the fiber optic cable 10 can be chosen based on a desired material property (e.g., hardness, etc.) along the length of the portion of the end portion 26. In one embodiment, the hardness of the end portion 26 of the fiber optic cable 10 at the interface with the fiber optic connector 24 is greater than the hardness of the end portion 26 of the fiber optic cable 10 disposed a distance away from the fiber optic connector interface.

In the depicted embodiment of FIG. 4, the connector end 158 of the fiber optic connector 124 is inserted into the bore 164 of the end portion 126 of the fiber optic cable 110. In one embodiment, an energy-active adhesive is disposed between the connector end 158 and the bore 164. The crimp 168 is positioned over the outer surface 118 of the outer jacket 116 at a location that is over the connector end 158. With the connector end 158 disposed in the bore 164, the crimp 168 is secured to the end portion 126 of the fiber optic cable 110. In one embodiment, the strength members of the fiber optic cable 110 can be disposed between an outer surface 118 of the outer jacket 116 and the crimp 168.

Energy from the energy source 170 is applied to the end portion 126 of the fiber optic cable 110 through the filter 172. The energy source 170 is adapted to change a material property (e.g., harden) of a portion of the end portion 126 of the fiber optic cable 110. In one embodiment, the energy source 170 is further adapted to cure the adhesive disposed between the connector end 158 and the bore 164.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fiber optic cable assembly comprising:
a fiber optic connector including a rear housing and a front housing, the rear housing of the fiber optic connector including a connector end that protrudes from an end surface of the rear housing, and
a fiber optic cable having an end portion that is adapted to receive the connector end of the fiber optic connector, the fiber optic cable including:
an optical fiber;
an outer jacket surrounding the optical fiber, the outer jacket having a length of variable flexibility, the length of variable flexibility having a constant diameter and thickness, the length of variable flexibility being provided by a base material of the outer jacket having a hardness that gradually decreases along the length of variable flexibility of the outer jacket extending rearwardly from the connector end of the fiber optic connector, wherein the base material hardens in response to exposure to an energy source.

2. The fiber optic cable assembly of claim 1, wherein the fiber optic cable includes a plurality of reinforcing members integrated into the base material.

3. The fiber optic cable assembly of claim 1, wherein the fiber optic cable includes a plurality of strength members.

4. The fiber optic cable assembly of claim 3, wherein the strength members are anchored to the fiber optic connector.

5. The fiber optic cable assembly of claim 1, wherein the connector end includes a plurality of flared portions.

6. The fiber optic cable assembly of claim 5, wherein the end portion of the fiber optic cable is disposed in a bore of the connector end.

7. The fiber optic cable assembly of claim 6, wherein a crimp secures the fiber optic connector to the end portion of the fiber optic cable.

8. The fiber optic cable assembly of claim 1, wherein an adhesive is disposed between the connector end and the end portion of the fiber optic cable.

9. The fiber optic cable assembly of claim 8, wherein the adhesive is an energy-active adhesive that cures in response to exposure to the energy source.

10. The fiber optic cable assembly of claim 9, wherein the adhesive hardens in response to exposure to ultraviolet light.

11. The fiber optic cable assembly of claim 1, wherein the base material hardens in response to exposure to ultraviolet light.

12. The fiber optic cable assembly of claim 1, wherein the outer jacket is adapted to serve as a strain relief that is integral with the fiber optic cable.

13. The fiber optic cable assembly of claim 1, wherein the fiber optic cable does not include a separate boot attached thereon.

* * * * *